(12) United States Patent
Xu et al.

(10) Patent No.: US 7,045,932 B2
(45) Date of Patent: May 16, 2006

(54) ELECTROMECHANICAL TRANSLATION APPARATUS

(76) Inventors: Qin Xu, 16 Blackwatch Trail, Apt. 11, Fairport, NY (US) 14450; John C Fasick, 7435 E. Main St., Lima, NY (US) 14485

( * ) Notice: Subject to any disclaimer, the term of this patent is extended or adjusted under 35 U.S.C. 154(b) by 172 days.

(21) Appl. No.: 10/793,365

(22) Filed: Mar. 4, 2004

(65) Prior Publication Data
US 2005/0035687 A1     Feb. 17, 2005

Related U.S. Application Data

(60) Provisional application No. 60/451,284, filed on Mar. 4, 2003.

(51) Int. Cl.
  *H02N 2/02* (2006.01)
  *H02N 2/04* (2006.01)
(52) U.S. Cl. .............. 310/323.17; 310/328; 310/12
(58) Field of Classification Search ............... 310/328, 310/323.17, 12
  See application file for complete search history.

(56) References Cited

U.S. PATENT DOCUMENTS

| | | | |
|---|---|---|---|
| 3,377,489 A | 4/1968 | Brisbane | 310/328 |
| 3,684,904 A | 8/1972 | Galutva et al. | 310/328 |
| 3,902,084 A | 8/1975 | May, Jr. | 310/328 |
| 3,902,085 A | 8/1975 | Bizzigotti | 310/328 |
| 4,460,842 A | 7/1984 | Waanders et al. | 310/338 |
| 4,709,183 A | 11/1987 | Lange | 310/328 |
| 4,874,979 A | 10/1989 | Rapp | 310/328 |
| 5,034,647 A | 7/1991 | Ohtsuka | 310/328 |
| 5,055,725 A * | 10/1991 | LaSota | 310/14 |
| 5,205,147 A | 4/1993 | Wada et al. | 72/429 |
| 5,319,257 A | 6/1994 | McIntyre | 310/328 |
| 5,751,090 A | 5/1998 | Henderson | 310/328 |
| 6,040,643 A * | 3/2000 | Bruns | 310/26 |
| 6,380,661 B1 | 4/2002 | Henderson et al. | 310/323.02 |
| 6,611,080 B1 * | 8/2003 | Ngol et al. | 310/323.02 |
| 6,927,528 B1 * | 8/2005 | Barillot et al. | 310/325 |

FOREIGN PATENT DOCUMENTS

DE     19643180 A1 *  4/1997

OTHER PUBLICATIONS

Q. Chen et al. "Mesoscale Actuator Device: Micro Interlocking Mechanism to Transfer Macro Load", Sensors and Actuators, v. 73 (1999), pp. 30-36.

* cited by examiner

*Primary Examiner*—Darren Schuberg
*Assistant Examiner*—J. Aguirrechea
(74) *Attorney, Agent, or Firm*—Hiscock & Barclay, LLP; Thomas R. FitzGerald, Esq.

(57) ABSTRACT

Electromechanical translation apparatus provides power-off clamping because each clamp assembly comprises pressure means and clamp actuator means acting in opposition. The pressure means is arranged, when the actuator is de-energized, to apply clamping force to releasably clamp the associated movable member to the clamp assembly. The clamp actuator means is arranged, when energized, to act against the pressure means to release the movable member.

16 Claims, 6 Drawing Sheets

ELECTROMECHANICAL TRANSLATION APPARATUS

CROSS-REFERENCE TO RELATED APPLICATIONS

This application claims priority from U.S. Provisional patent application No. 60/451,284 filed Mar. 4, 2003, the contents of which are incorporated herein by reference.

GOVERNMENTAL SUPPORT

This invention was made with Government support under contract F29601-00-C-0179 awarded by Air Force Research Laboratory, Kirtland AFB, NM.

DESCRIPTION

1. Technical Field

The present invention relates to electromechanical translation apparatus and in particular to incremental linear motors and actuators.

2. Background Art

In known incremental electromechanical linear motors and actuators, high resolution stepwise microscopic movement is effected by expanding an extension element (e.g., a piezoelectric element or stack) while one of its ends is fixed relative to a reference and the other end is free to move, then releasing the one end, fixing the other end and allowing the extension element to contract again. Repeating this cycle at high speeds provides very precise step-by-step movement. Examples of such linear motors and actuator are disclosed in the following United States patent specifications: U.S. Pat. No. 3,377,489, U.S. Pat. No. 3,684,904, U.S. Pat. No. 3,902,084, U.S. Pat. No. 3,902,085, U.S. Pat. No. 4,709,183, U.S. Pat. No. 4,874,979, U.S. Pat. No. 5,319,257, U.S. Pat. No. 5,034,647, U.S. Pat. No. 5,751,090 and U.S. 6,380,661, which are incorporated herein by reference.

U.S. Pat. Nos. 4,709,183 and 5,319,257 disclose linear motors of this kind in which the reference point (fixed point) is at the middle of the extension actuator for smoother motion. However, other configurations are possible for different applications. In U.S. Pat. No. 4,874,979, the reference point is between the extension actuator and one of the clamp actuators for less glitch in one direction during clamp changes and less creep effect of the extension. Some of the "peristaltic motors" (e.g. in U.S. Pat. Nos. 3,377,489, 3,684,904, and 5,751,090) are just variations of the above mechanism, with shaft (or sleeve) fixed as a reference point, while the clamping and extension actuators move to provide power to the outside world.

In general, a distinct advantage of these types of linear motors and actuators is that they maintain high resolution (nanometer) capability throughout the entire long range of travel and provide high stiffness and fast response. A typical disadvantage of these types of linear motors and actuators, however, is low output mechanical power (low push force and low speed). The typical push force for classic Inchworm motors is in the 10 to 20 N range and speed is several mm/s. Power density is several tenths of 1 W/Kg.

A further disadvantage of the above-mentioned different configurations wherein the two clamp assemblies always move with the extension assembly during the motion, is that the clamp assemblies add significant mass to the moving mass and reduce system resonance frequency. As a result, these motors/actuators cannot be operated at high clamping frequencies or high speed.

The push force is normally limited by the friction between the surface of the driven shaft and the clamping units. One approach to improving the holding force, disclosed in the article "Mesoscale Actuator Device: Micro Interlocking Mechanism to Transfer Macro Load", Sensors and Actuators, v. 73 (1999), pp. 30–36.), Q. Chen, et al., is to use Micro-Electromechanical Systems (MEMS) fabrication methods to produce mechanical teeth with micrometer-scale dimensions. Unfortunately, while adding teeth does, in fact, increase the hold and push force (~500 N), the relatively large pitch of the interlocking teeth means that it does not have the capability of holding at any position at nanometer resolution. Moreover, it makes the motor operation sequence complicated at high clamping frequency and, the relatively heavy clamp and extension assemblies make it unable to run at high clamping frequency (500 Hz).

U.S. Pat. No. 6,380,661 describes a linear incremental bi-directional motor which utilizes a multi-clamp mechanism to significantly increase the holding and friction force. This results in a very large push force and thus a high power output. However, the two clamp assemblies and the extension assembly are linked together. The extension assembly cannot respond to high operating frequency fast enough, and therefore the motor cannot move at high speed.

U.S. Pat. No. 5,034,647 discloses a driving mechanism comprising two clamp assemblies fixed in space, with a movable extension member. While this mechanism should yield higher motor speed due to its lower moving mass, the motion of the clamp assembly is transferred to the clamping surfaces by movable levers pivoting around a hinge. This clamp assembly mechanism will not work at high clamping speed while ensuring rigidity of the clamp assembly for strong clamping force, since the moving mass will be big.

A significant cause of failure in motors of the kind disclosed in U.S. Pat. Nos. 3,902,084 and 3,902,085 arises from the cracking and subsequent arcing of the piezoelectric clamping and extension elements due to cyclic tensile stresses, which can exceed 3000 psi at more than several kHz. The strain is usually large and the electrical field involved is high, at 0.5–3 MV/m. These operating conditions are severe for brittle piezoelectric materials. It is very desirable to provide compressive preload to these elements and thus to elongate the reliability and lifetime of the motor. In addition, a beneficial byproduct from the compressive preload is a slight increase in transforming efficiency of these piezoelectric elements.

U.S. Pat. Nos. 4,460,842 and 5,205,147 disclose means for preloading multi-layer piezoelectric elements by means of cases or sleeves, threads, movable pieces for coupling load, compressive springs, or disc springs. This is not entirely satisfactory, however, because they are usually bulky and heavy which detracts from operating speed.

DISCLOSURE OF INVENTION

The present invention seeks to overcome, or at least ameliorate, one or more of the disadvantages of these known electromechanical translation apparatus, or at least provide an alternative.

Accordingly, one aspect of the invention provides for power-off clamping because each clamp assembly comprises pressure means and clamp actuator means acting in opposition, the pressure means being arranged, when the actuator is de-energized, to apply clamping force to releasably clamp the associated movable member to the clamp assembly, and the clamp actuator means being arranged, when energized, to act against the pressure means to release the movable member, According to this one aspect of the present invention, there is provided electromechanical translation apparatus comprising a support (10), first and second clamp assemblies (11A, 11B) fixedly secured to the support (10) at spaced apart locations, an extension actuator assembly (13) between the first and second clamp assemblies, and first and second movable members (12A, 12B) each having one end connected to a respective one of the opposite ends of the extension actuator assembly, the movable members (12A, 12B) extending through the clamp assemblies (11A, 11B), respectively, wherein each clamp assembly comprises pressure means and clamp actuator means acting in opposition, the pressure means for applying, when the actuator is de-energized, clamping force to releasably clamp the associated movable member to the clamp assembly, and the clamp actuator means, when energized, acting against the pressure means to release the movable member, and control means for selectively actuating the extension actuator and the clamp actuators so as to impart stepwise motion of the movable members relative to the support.

According to a second aspect of the invention, there is provided electromechanical translation apparatus comprising a support (10), first and second clamp assemblies (11A, 11B) fixedly secured to the support (10) at spaced apart locations, an extension actuator assembly (13) between the first and second clamp assemblies, and first and second movable members (12A, 12B) each having one end connected to a respective one of the opposite ends of the extension actuator assembly, the movable members (12A, 12B) extending through the clamp assemblies (11A, 11B), respectively, wherein each movable member comprises a pair of limbs connected together at their respective ends and extending through the associated clamp assembly, the clamp assembly comprising actuator means for controlling releasable clamping of the limbs to the clamping assembly.

A single actuator means may be located between the limbs and, preferably, act in opposition to a pressure member that applies pressure to clamp the limbs.

According to a third aspect of the invention, there is provided electromechanical translation apparatus comprising a support (10), first and second clamp assemblies (11A, 11B) fixedly secured to the support (10) at spaced apart locations, an extension actuator assembly (13) between the first and second clamp assemblies, and first and second movable members (12A, 12B) each having one end connected to a respective one of the opposite ends of the extension actuator assembly, the movable members (12A, 12B) extending through the clamp assemblies (11A, 11B), respectively, wherein the extension actuator assembly comprises a piezoelectric actuator element (47) housed in a holder (49) having means for applying compressive stress to the actuator element.

Preferably, the compressive stress applying means comprises a pair of bow members extending between respective end portions of the holder and prestressed outwardly so as to urge said end portions towards each other and compress the piezoelectric actuator element therebetween.

According to a fourth aspect of the invention, there is provided electromechanical translation apparatus comprising a support (10), at least one member movable relative to the support, first and second clamp assemblies (11A, 11B) for selectively clamping the movable member to the support, and extension means for extending and contracting to impart stepwise relative motion between the support and the movable member, wherein each clamping assembly comprises a piezoelectric clamping actuator and preloading means for applying a preload force to the piezoelectric actuator.

Preferably, the preloading means comprises a pair of wedges one adjustable relative to the other to adjust a spacing between the movable member and the clamp assembly.

Various objects, design features, and advantages of the invention will become apparent from the following description of a preferred embodiment of the invention, which is given by way of example only.

DETAILED DESCRIPTION OF PREFERRED EMBODIMENTS

Figure 1:
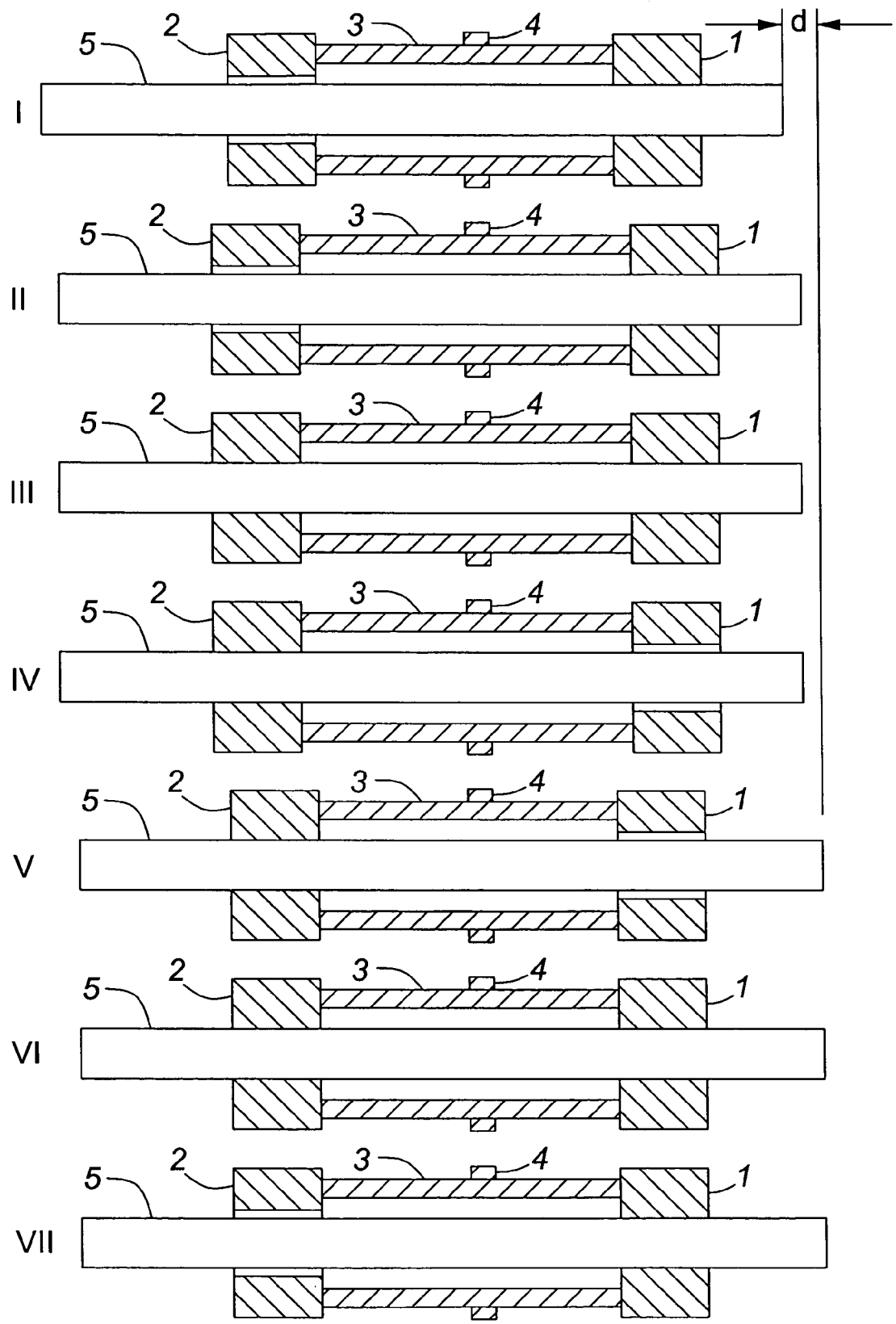
FIG. 1, labelled PRIOR ART, illustrates schematically the basic configuration and operation of a piezoelectric motor of the kind marketed as Inchworm® by EXFO Burleigh Products Group Inc.

In order to facilitate an understanding of the novel construction and operation of motors embodying the present invention, typical construction and operation of a classic Inchworm® motor will first be described with reference to FIG. 1, which shows the motor schematically as comprising two clamp assemblies 1 and 2 connected to opposite ends, respectively, of an extension actuator 3. A support 4 connects the middle of the extension actuator 3 to a fixed external body (not shown), which is a reference point. A shaft 5 extends through both clamp assemblies 1 and 2 and is supported by an external bearing system (not shown). In operation, successive and alternating actuation of the clamps 1 and 2 and associated actuation of the extension actuator 3 causes the shaft 5 to move longitudinally relative to the clamp assemblies 1 and 2 and extension actuator 3.

Assuming start from rest, the actuation of the extension and clamp assemblies to perform a complete motion cycle is as follows:

I. Clamp 1 is activated and clamp 2 deactivated. The extension actuator 3 remains contracted. Load is transferred to clamp 1.
II. The extension actuator 3 expands linearly until full stroke is reached. Corresponding motion of the shaft 5 is linear.
III. Clamp 2 is activated. Clamp 1 remains activated. The extension actuator 3 remains stationary at its fully extended position.
IV. Clamp 1 is deactivated, transferring load to clamp 2 which remains activated.
V. The extension actuator 3 linearly retracts to its initial "no power" state.
VI. Clamp 1 is activated.

VII. Clamp 2 is deactivated transferring load to clamp 1. The motor is again in the condition shown in step I. The cycle repeats to step II.

A disadvantage of this arrangement is that, when the extension actuator 3 expands, it moves not only the shaft 5 but also the free clamp assembly. This limits the speed at which the motor can operate, since the clamp assembly has a relatively large mass.

An embodiment of the present invention which avoids this limitation will now be described with reference first to FIGS. 2 and 3, which show a linear incremental motor comprising a cylindrical support frame or housing 10, two circular clamp assemblies 11A and 11B secured one to each end of the housing 10, and a pair of two-limbed shafts 12A and 12B extending through clamp assemblies 11A and 11B, respectively, with their respective external or distal ends protruding from the housing 10 and an extension actuator assembly 13 connected between their respective interior or proximal ends. Selective actuation of the clamp assemblies 11A, 11B and the extension actuator assembly 13, in a manner to be described later, imparts movement to the shafts 12A and 12B whose distal external ends transmit the movement to whatever device is coupled thereto.

The clamping assemblies 11A and 11B are identical, so only one (11B) will be described, with reference to FIGS. 5 and 6. Clamping assembly 11B comprises a disc-shaped clamp body 14 having a central through hole which has three generally rectangular portions, 15A, 15B and 15C, having different widths and one above the other, the lowermost portion 15A being narrowest and the uppermost portion 15C being widest.

The widest hole portion 15C (shown uppermost in FIGS. 5 and 6) is occupied by a beam 18 coupled to the surrounding parts of body 14, i.e. the ends of hole portion 15C, by two pairs of flexures 19/1, 19/2 and 20/1, 20/2, one pair at each end of the beam 18, i.e., the beam 18 is double-hinged. The beam 18 and flexure pairs 19/1, 10/2, 20/1 and 20/2 are formed integrally with the clamp body 14, conveniently by machining from a block of, for example, hardened stainless steel.

A piezoelectric clamp actuator comprising two blocks 21/1 and 21/2 is disposed in the rectangular middle portion 15B and between the beam 18 and the adjacent surface of one of a pair of opposed wedges 22 and 23 that are accommodated at least partially in the lowermost rectangular hole portion ISA. Each of the blocks 21/1 and 21/2 comprises a medium hard piezoelectric multilayer actuator block. The piezoelectric blocks 21/1 and 21/2 are bonded together and block 21/2 is bonded to the uppermost surface of wedge 22.

Figure 5:
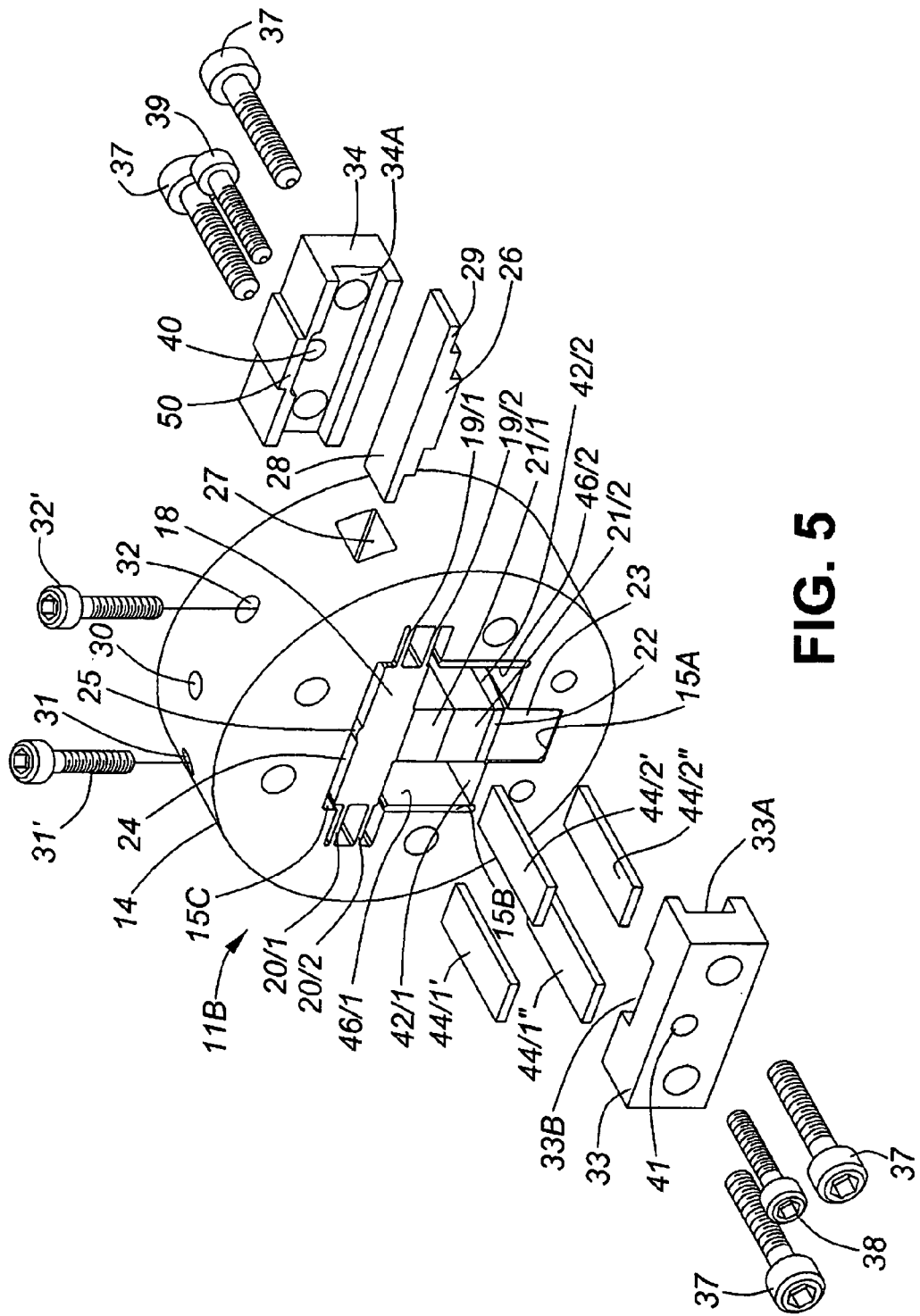
FIG. 5 is an exploded view of a clamp assembly of the motor.

The surface 24 of the beam 18 shown uppermost in FIG. 5 has a medial protrusion 25 which engages against a juxtaposed surface of a leaf spring 26 located in a slot 27 extending through the upper portion of the clamp body 14 and generally parallel to the beam 18. The leaf spring 26 is stepped at opposite ends to leave reduced thickness end portions 28 and 29, respectively.

Figure 6:
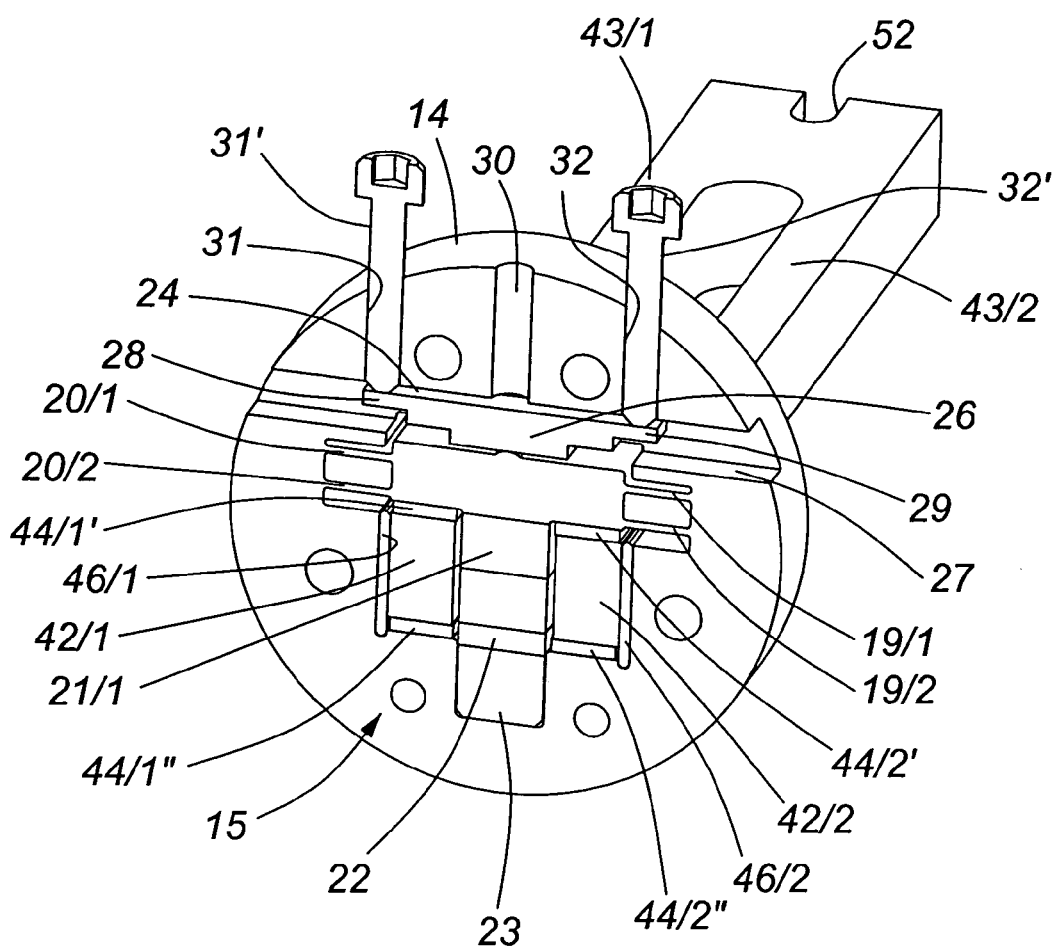
FIG. 6 is a cross-sectional perspective view of the clamp assembly.

As shown in FIG. 6, three holes 30, 31 and 32 extend into the clamp body 14 from its (uppermost) edge adjacent the slot 27 and with their axes generally perpendicular to the longitudinal axis of slot 27. The outer holes 31 and 32 are screwthreaded and have setscrews 31' and 32' respectively, screwed into them to engage the end portions 28 and 29, respectively, of the leaf spring 26. Adjustment of the screws 31' and 32' alters the pressure exerted by leaf spring 26 upon beam 18 and hence the preloading of the piezoelectric clamp actuators 21/1, 21/2. The middle hole 30 is not screwthreaded but merely provides access to the middle of leaf spring 26 during assembly of the clamp assembly, to be described later.

Figure 2:
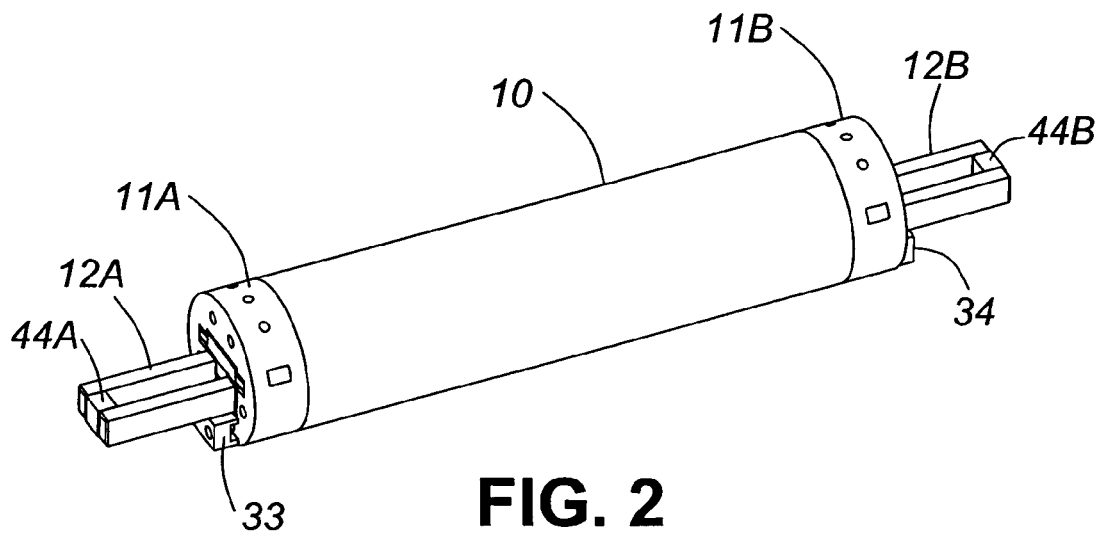
FIG. 2 is a perspective view of a linear motor embodying the present invention.
Figure 3:
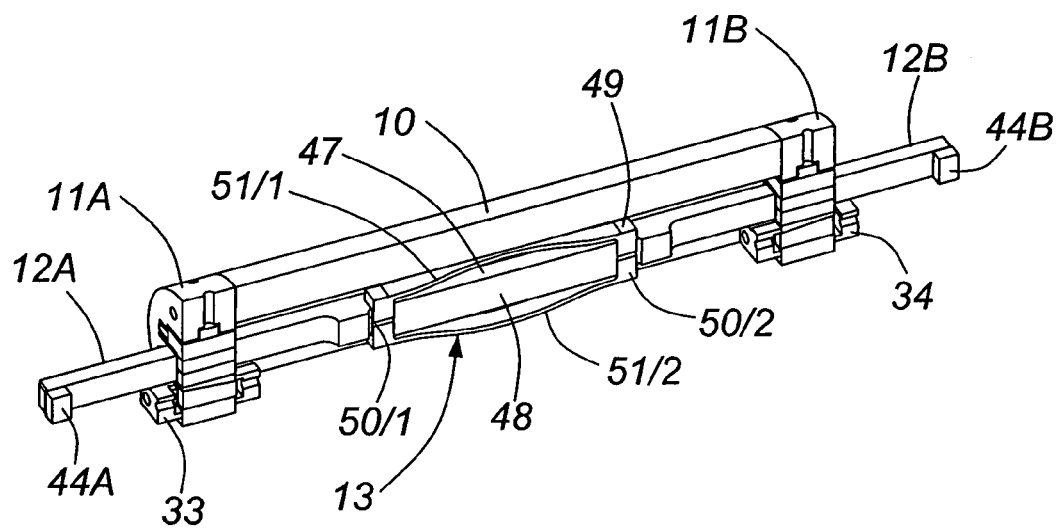
FIG. 3 is a longitudinal cross-sectional perspective view of the motor of FIG. 2.

As shown in FIGS. 2, 3 and 5, a pair of channel-shaped brackets 33 and 34 having channels 33A and 34A, respectively, are secured by screws 37 to opposite faces of the clamp body 14, each straddling an opposite end of the lower hole portion or recess 15A. The screws 37 pass through end portions of the brackets 33 and 34. Preloading adjustment screws 38 and 39 extend in screwthreaded holes 41 and 40 each through the middle of a respective one of the brackets 33 and 34, respectively, to bear against end surfaces of wedge 23. Adjustment of screws 38 and 39 allows the wedge 23 to be moved bidirectionally to adjust the distance between the uppermost surface of upper wedge 22 (uppermost in FIGS. 5 and 6) and the juxtaposed side of beam 18. These preload adjustment devices, comprising the brackets 33 and 34 and setscrews 38 and 39, allow adjustment of the preloading force upon the piezoelectric clamp actuators 21/1, 21/2.

The clamp actuators 21/1 and 21/2 occupy only the middle portion of hole portion 15B, leaving rectangular openings 42/1 and 42/2 on either side. The shaft 12B has parallel limbs 43/1 and 43/2, each of rectangular cross-section, extending through rectangular openings 42/1 and 42/2, respectively. The limbs 43/1 and 43/2 are shown connected together at their distal ends by a block 44/B to ensure adequate stiffness, though in practice, they might be interconnected by whatever device they are connected to for drive purposes. Two friction pads 44/1' and 44/1" are provided one on each side of the limb 43/1 of shaft 12B, the uppermost (as shown) pad 44/1' adhered to the adjacent surface of beam 18 by structural adhesive, and the lowermost pad 44/1" adhered to the lowermost surface of rectangular opening 42/1. A second pair of friction pads 44/2' and 44/2" are provided in a similar manner either side of limb 43/2 of beam 12B.

These friction pads are flat and parallel and may be made of various materials. In this preferred embodiment, they are silver.

In addition, bearing pads 46/1 and 46/2 are provided between limbs 43/1 and 43/2 and the adjacent surfaces of the middle portion 15B of hole 15.

The top surface of clamp actuators 21/1, 21/2, acts between the top of wedge 22 and the underside of double-hinge beam 18. The beam 18 and flexures 1911, 19/2, 20/1, 20/2 are designed to ensure precise alignment during the engagement of the friction pads 44/1', 44/1", 44/2' and 44/2" as well as provide part of the load path to carry the external load, while avoiding tilting which would increase compressive stresses on the actuators.

The double-hinge beam 18 is designed to provide both the rotational/lateral (along the motor moving axis) stiffness and strength. Along the clamp actuator axis, it is relatively compliant (relative to the clamp actuator) to allow high clamping efficiency. During assembly, the clamp actuators 21/1, 21/2 are activated and further preloaded against the flexures 19/1, 19/2, 20/1, 20/2 by adjustment of the bottom wedge 23 (mating to the top wedge 22). The wedge design provides high sensitivity for adjustment while maintaining a stiff backing structure for the clamp actuators 21/1, 21/2 to act against. This direct clamping drive mechanism, i.e., whereby movement of the actuator by, say, 2 μm produces almost 2 μm of movement of the friction pads, (assuming close to 100 percent efficiency since it always has some losses in the driving mechanism) allows fast response time of the clamping action and ensures the motor operating at high clamping frequency (or high motor speed).

Since the flexure and clamp assembly material should provide high strength and long fatigue life, the use of, for example, hardened stainless steel 416 is one consideration.

Figure 4:
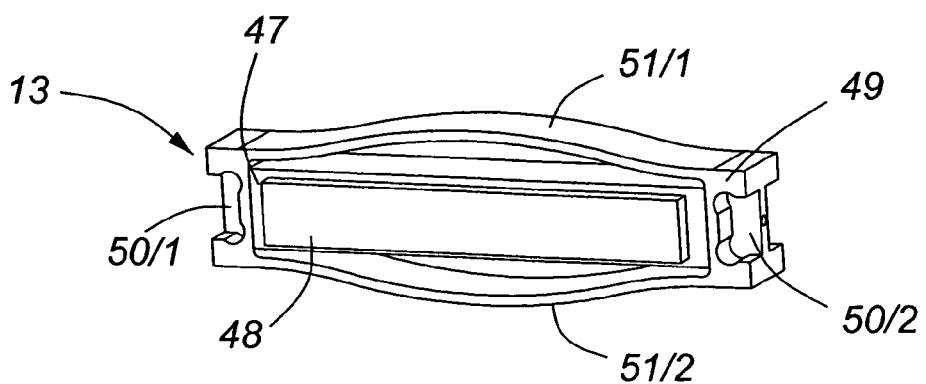
FIG. 4 shows an extension actuator assembly of the motor.

As shown in FIGS. 3 and 4, the extension actuator assembly 13 comprises an elongate parallelepiped piezoelectric extension actuator 47 having electrodes 48 on opposite sides (only one is shown) in a flexure unit 49 having integral coupling members 50/1 and 50/2 at its opposite ends for coupling to complementary coupling members of the shafts 12A and 12B, respectively. The flexure unit 49 comprises two outwardly-curved bow members 51/1 and 51/2 each extending between the coupling members 50/1 and 50/2. The bow members 51/1 and 51/2 are prestressed to flex outwards and force the coupling members 50/1 and 50/2 towards each other, to impart compressive stress to the piezoelectric extension actuator 47.

In operation, the clamp actuators 21/1, 21/2 and extension actuator 47 are energized selectively and alternately by control means, the construction of which should be obvious to one skilled in the art and so will not be described or shown herein. The two clamps 11A and 11B act as clutches that alternately grip and release the shafts 12A and 12B, respectively, while the extension actuator 47 extends to move the shafts 12A and 12B apart and contracts to bring them together again. Linear motion is achieved by the rectified incremental motion of the extension actuator, directed along the length of the actuator.

The alignment of the extension assembly 13 and shafts 12A and 12B with the clamping assemblies 11A and 11B is provided by the bearing surfaces 46/1 and 46/2 attached to the side-walls of the hole portion 15B in each of the clamp bodies 14.

Figure 7:
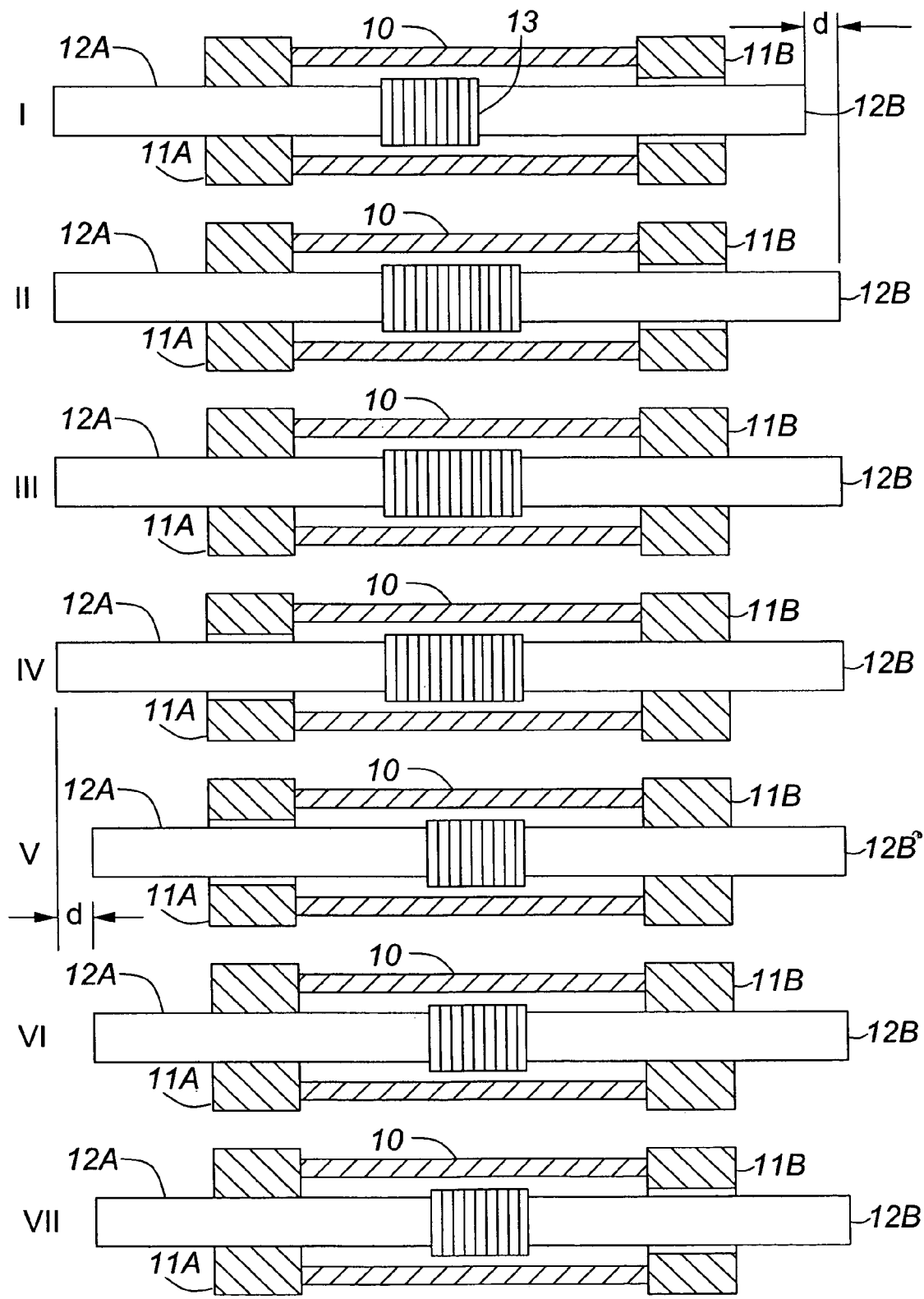
FIG. 7 is a schematic diagram illustrating a complete cycle of operation of the motor.

Operation of the motor will now be described with reference to FIG. 7. Assuming the motor starts from rest, the actuation of the clamp assemblies 11A and 11B and the extension actuator assembly 13, specifically by means of their respective actuators 21/1, 21/2, and 47, to perform a complete motion cycle is as follows:

I. Clamp assembly 11A is activated and clamp assembly 11B deactivated. The extension assembly 13 remains stationary. Load is transferred to clamp assembly 11A.
II. The extension assembly 13 expands linearly until full stroke is reached, moving shaft 12B with linear longitudinal motion out of the housing 10 by a distance d.
III. Clamp assembly 11B is activated. Clamp assembly 11A remains activated. The extension assembly 13 remains stationary at its fully extended position. Load is shared between both clamp assemblies 11A and 11B.
IV. Clamp assembly 11A is deactivated while clamp assembly 11B remains activated, transferring the load to clamp assembly 11B.
V. Extension assembly 13 retracts to its initial state, drawing shaft 12A into the housing 10 by the distance d.
VI. Clamp assembly 11A is activated while clamp assembly 11B remains activated. Load is shared between both clamp assemblies 11A and 11B.
VII. Clamp assembly 11B is deactivated, transferring all of the load to clamp assembly 11A and returning the motor to the condition of step I. The cycle then repeats, moving the shafts 12A and 12B and the extension actuator assembly 13 from left to right in FIG. 7, in steps of length d.

Although, superficially, the above operating sequence seems to be similar to that of the classic Inchworm® motor illustrated in FIG. 1, there are, in fact, important differences resulting from the way in which the clamp and extension assemblies are constructed and operate. As described hereinbefore, in the Inchworm® motor of FIG. 1, the clamp assemblies 1 and 2 are linked to the extension actuator 3 so their relatively large mass must be moved along with the shaft 5. In contrast, in the motor shown in FIGS. 2 to 5, the clamp assemblies 11A and 11B remain stationary while the extension actuator assembly 13 moves with the shafts 12A, 12B along the long axis of the device. The extension actuator assembly 13 comprises only extension actuator 47, its support 49 with couplings 50/1, 50/2 and extension flexures 51/1, 51/2, which are of relatively light mass. The shafts 12A and 12B, being two-limbed, also have relatively low mass yet adequate stiffness, since the limbs of each shaft are connected together at their distal and proximal ends and "braced" by the friction pads and bearing pads where they pass through the clamping assembly.

As a result of this configuration, the effective moving mass is greatly reduced and the clamp assembly structure stiffness is increased. This results in a higher system natural frequency, which in turn allows the device to be driven at higher clamping frequencies and higher speeds. The motor still is capable of bi-directional movement; the motor direction can be easily reversed by reversing the extension actuator's motion in the previous sequence.

Electro-mechanical transmission apparatus of this kind, the friction coefficient and the force generated between the clamp surfaces (pads) and the shaft, normal to the longitudinal axis of the shaft, directly determines the final output push force. The friction coefficient may be improved by selecting a suitable material for the friction pads 44/1', 44/1", 44/2', 44/2".

Increased force normal to the direction of movement and between the pads 44/1', 44/1", 44/2', 44/2" and the shafts 12A, 12B results from compressive force in the clamp actuator and additional preload force provided on the top of the double-hinged beam 18. The leaf spring 26 is made of a material of high tensile stress and yield stress, e.g., beryllium copper or stainless steel. The two setscrews 31', 32' tightened through the two tapped holes 31 and 32 pressing at the two end portions 28 and 29 of the leaf spring 26 exert preloading force which is transmitted to the double-hinge beam 18 and thence to the clamp actuators 21/1, 21/2 and the shafts 12A, 12B. In general, higher preload force is better for the clamp actuator and generates greater friction between the pads and the shaft allowing for greater push force from the motor.

The adjusting hole 30 at the top of the clamp assembly is useful when there is initially a slight gap between the friction pads and shaft (e.g., due to manufacturing tolerance). One can insert a rigid tool into the adjusting hole 30 and press against the protrusion 25 on the double-hinge beam 18 (before inserting the leaf spring 26). Enough force is needed to deflect and yield the double hinge beam 18 properly to set the fit between the shaft and the pads and adjust the normal force between them. This is intended for coarse adjustment, and therefore is not accurately controlled. Fine adjustments are easily provided by the two preload fixtures comprising brackets 33 and 34 fastened by screws 37 to clamp body 14 and their adjusting screws 38 and 39, respectively, for adjusting the wedge 23 bidirectionally.

As described above, the two screws 38 and 39 in the two channel brackets 33 and 34, respectively, are used to further adjust the force between the pads and shaft and normal to the latter, and the compressive force applied to the clamp actuator. As shown in FIG. 5, bracket 33 has a rectangular cut-out 33B directly facing the bottom wedge 23 to partially accommodate it if the bottom wedge 23 needs to be loosened (away from the top wedge 22) during adjustment. Hence, the bracket 33 has three surfaces acting against the body 14. When setscrew 38 is tightened through the tapped hole in bracket 33 and pushes on the front side of the bottom wedge 23, sliding it under the top wedge 22, it effectively lifts the beam 18 against the action of the double-hinge flexures 19/1, 19/2, 20/1, 20/2, increasing the compressive force in the clamp actuators 21/1, 21/2, and reducing the normal force the pads exert upon the shaft limbs 43/1, 43/2.

The adjustment bracket 34 for decreasing the compressive force on the clamp actuators 21/1, 21/2 and increasing the normal force between the pads and shaft limbs is mounted on the clamp assembly body 14 by fastening screws 37, with its flange edges either side of a central channel 34A flush with the back surface of the body 14. The channel 34A accommodates, at least partially, the thinner end of bottom wedge 23. A protrusion 50 on the uppermost (as shown) surface of bracket 34 is positioned directly facing the top wedge 22 to stop the top wedge 22 and the clamp actuators 21/1, 21/2 from moving out of the clamp body 14 as the bottom wedge 23 slides under the top wedge 22 during adjustment.

When set screw 39 is tightened through the tapped hole in bracket 34 and pushes the bottom wedge 23 away from the top wedge 22, it effectively lowers the double-hinge beam 18, decreasing the compressive force in the clamp actuators 21/1, 21/2, and increasing the force exerted by the pads in the direction normal to the shaft. These two brackets 33 and 34 make the adjustment of the bottom wedge 23 bidirectional, and therefore make it very easy to adjust the normal force between the pads and the shaft.

To sum up, the actual assembly process for each of the clamp assemblies 11A and 11B will proceed as follows:

The friction pads are cut to proper size with their surfaces flat and parallel.

The pads are bonded to the clamp assembly as shown in FIG. 6 (e.g., using structural adhesive).

The gap between the pads and the shaft is adjusted by inserting a suitable tool through the adjusting hole at the top of the clamp assembly.

The bottom wedge 23 and the leaf spring 26 preload are both adjusted, while the clamp actuator 21/1, 21/2 is activated (powered on to the highest operating voltage). The friction force between the pads and the shaft is constantly monitored. The optimum setting is when the friction force just becomes minimal (i.e., the clamping surfaces on the pads and the shafts just touch), preferably with the leaf spring preload adjusted to the maximum allowed value. This ensures that the preload does not unnecessarily reduce the power-off clamping force.

When the clamp actuator 21/1 and 21/2 contracts (powered off or supplied with the lowest voltage), the preload leaf spring 26 and residual force applied by the double-hinge flexures 19/1, 19/2, 20/1, 20/2 to the beam 18 will push the top two pads 44/1' and 44/2' down onto the shaft, the force then being relayed to the bottom two pads. This normal force provides the friction force that determines the push force of the motor. Therefore, this kind of motor has reversed clamping action as compared with typical Inchworm® motors.

An important benefit or feature of the clamp assembly design in embodiments of this invention is that each clamp assembly (and thus the motor) provides holding force when the clamp actuator 21/1, 21/2 is powered off (contracted from the 'power on' state). When the whole motor is powered off, the two clamp assemblies in the motor both provide the holding force. Usually this combined power-off holding force is higher than that when the motor is powered on (only one clamp holds the extension assembly). This power-off holding capability is useful in many industrial and military applications. It may allow a single driving circuit to drive several motors by multiplexing, and therefore increase system efficiency. Secondly, in many cases after a certain travel, motors are required just to hold that position. When doing so in this case, power-off holding motor does not waste power and generates no heat.

Another feature of this clamp assembly design is that it is capable of holding or pushing much higher force load when the normal force is high enough. The pads are rectangular in shape and longer in the motor's main axis. When the normal force is high enough, the pads tend to self-lock due to a small twisting motion of the double-hinge beam 18 along the load/movement direction, almost regardless of the load force. When this happens, the holding force is much larger than that projected by the pure friction force calculated proportionally based on the normal force.

The double-hinge flexure, the leaf spring, and the above preload adjustment methods ensure that each clamping actuator 21/1,21/2 is always under compressive force, which extends the life of the actuator and the whole motor. It also provides an easy and effective way to adjust the normal force, and thus the friction force, between the pads and the shaft to a very high precision. Typically the clamp actuator footprint is 3 mm×7 mm, and typical thickness ranges from 4 to 8 mm. By proper choice of multi-layer piezoelectric actuators for the clamp actuators 21/1, 21/2, the friction force can easily exceed 150 N.

During operation, the moving portion of the motor comprises the extension actuator assembly 13 and, selectively the front and rear shafts 12A, 12B. The extension actuator 47 is mounted in the support 49 and bonded with structural adhesive. The shafts 12A, 12B are bonded to the ends of the support 49 using a high strength adhesive.

FIG. 4 shows the details of the extension actuator assembly 13. The extension flexure unit 49, as a stand-alone component, is compliant along the axial direction yet stiff in all other directions. It is sized to provide enough preloading to the actuator element 47 (roughly equal to the blocking force of the extension actuator), while still ensuring good displacement of the extension actuator. High strength and fatigue life material is selected, e.g., stainless steel 416. To preload the actuator 47, the internal flexure cavity housing the actuator 47 is slightly undersized such as to create an interference with the actuator 47. The bow portions 51/1 and 51/2 of the flexure unit 49 then are squeezed together to lengthen the cavity and allow insertion of the actuator 47. Thus, the flexure unit 49 preloads the extension actuator 47 and isolates the extension actuator 47 from external loads. The extension actuator 47 is sized properly to achieve the needed actuator stroke and motor speed. Preferably, the flexure unit 49 is made of hardened stainless steel.

Because the top and bottom surfaces of the shaft limbs are the surfaces contacting with the pads in each clamp assembly, they need to have good flatness, parallelism, and decent roughness. They are constantly moving in the motor's main axis between clamp changes. In order to increase speed and response, they are best made of material of high stiffness, high strength, and low density. One of the best material for the shafts 12A and 12B is silicon carbide (SiC), which has a high stiffness to mass density ratio. Each shaft is designed and mounted to eliminate all degrees of freedom except along the axis of travel. A groove 52 in the end of the shaft is used to facilitate the bonding process and provide good bond strength between the extension flexure unit 49 and the shaft.

The outer side surfaces of the shaft links in the extension assembly are bearing guides of the motor. When the two shafts move back and forth in the motor, the two bearing pads 46/1, 46/2 (preferably made of Teflon®), which are attached to the wall of 15B, make close contact with the side surfaces of the shafts, and provide the needed bearing surface to constrain the shafts. With the help of the friction or clamping pads, which essentially eliminate the pitch and up-down motion of the extension assembly, the only degree of freedom left for the extension assembly is along the motor main axis. After the whole motor is assembled (the extension assembly and the two clamp assemblies are fit together), the shaft end blocks are used to bond the two limbs of each shaft at the end of the shaft to reduce any "tuning fork" vibrations and increase the structural strength. The blocks can also be specifically designed to facilitate connecting to a load.

The extension assembly shown in FIG. 4 is designed to be low mass and high stiffness, high load capacity, and can be operated at high frequency. The extension actuator is also preloaded by the extension flexure and thus can be very durable. A typical extension assembly based on this design generates a natural frequency >5000 Hz, load capacity of 250 N, minimal mass (~10 gram), and one cycle stroke >20 μm (for a ~20 mm long extension actuator).

The four mounting holes at the middle and upper part of the clamp body are used to fasten the clamp assembly to the support frame (or housing) 10. Although not shown, the frame can be made into various shapes and from various materials for different applications. Typically, the frame is a rigid cylinder (made of steel or aluminum) with a central cavity that allows the extension assembly to move through it. The frame also provides a shield for electrical wires (not shown) connecting the control system (not shown) to the clamp and extension actuators. The frame length is mainly determined by the travel distance for a particular application. The less the travel required, the less the frame can be in the motor axis. In theory, the frame length is the travel distance plus the extension flexure length. The frame can have mounting holes to secure the motor. Sometimes, the frame can be omitted entirely for applications where the clamp assemblies can be directly mounted to the rest of the apparatus. This flexibility and the component-concept design allow this motor to be used in applications where space is limited.

Where piezoelectric actuators are the preferred choice for the clamp and extension actuators in embodiment of this invention, because of their fast response speed, high resolution, and high power density, other types of actuators could be used. In particular, medium hard piezoelectric multi-layer actuators are capable of both high frequency and high strain operation, and are generally suitable for demanding applications, where high resolution, high speed, high force, and high power density are required.

Typical force and speed that can be achieved from this design exceed 150 N push force and 50 mm/s speed with the mass of the motor approximately 50 gram. Motors embodying this invention exceed current commercially available Inchworm® motors by at least 10 fold in terms of push force and speed, and more than 100 times in terms of power and power density. The resolution is at the nanometer level and the length of travel can be in the range of 2 to 50 mm, similar to typical (or commercially available) Inchworm® motors.

The clamp assemblies of embodiment of this invention have power-off hold capability. However, it is understood that the clamp assembly itself is a separate component and using this kind of clamp assembly in applications other than the linear Inchworm® motors presented here still falls into the scope of this invention. In particular, it is possible to use these clamp assemblies to construct a rotary type of Inchworm® motor, by using clamping surfaces of a curved shape (FIG. 8), or side-wall bearing surfaces of a curved shape. It is also possible to replace each of the clamp assemblies of the Inchworm motor in this invention by multiple clamp assemblies so that they work together or serially, and therefore to increase the motor push force or speed accordingly.

Since the push force of an Inchworm® type motor is determined by both the surface tribology between the shaft and pad surfaces and the clamping normal force, it is easy to foresee that one can construct a more powerful Inchworm® type motor by improving the surface tribology based on the design herein. However, this will still fall within the scope of this invention.

It is envisaged that, instead of a shaft having parallel limbs with a single clamp actuator between them, a single shaft could be provided between a pair of clamp actuators which would be operated simultaneously, other parts of the clamping assembly being modified as appropriate.

Figure 8:
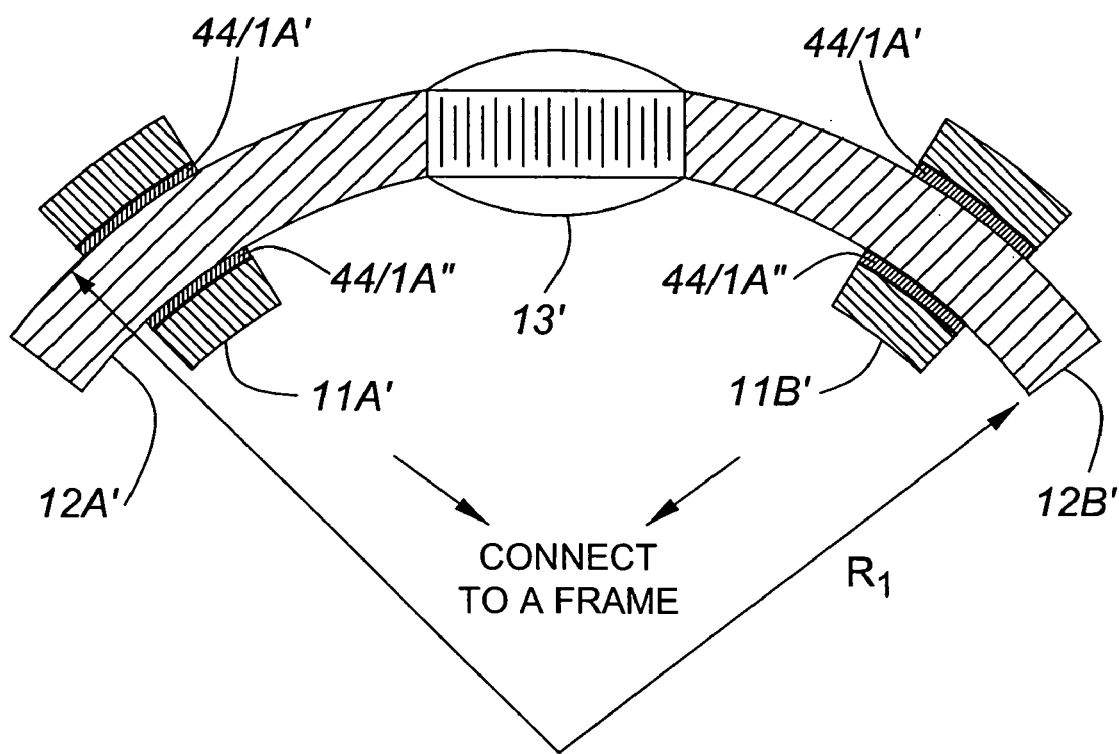
FIG. 8 illustrates a modification which provides arcuate motion.

As shown in FIG. 8, the invention embraces an electromechanical apparatus which provides rotary motion. Thus, FIG. 8 shows a pair of curved shafts 12A', 12B' interconnected by a curved extension actuator assembly 13' and extending through clamp assemblies 11A', 11B' similar to those shown in FIGS. 2 to 6 but with curved clamping surfaces and curved friction pads 44/1A' and 44/1A". Alternatively, the apparatus may be curved in an orthogonal plane, so the sidewalls of the hole portion 15B and the bearing pads (46/1 and 46/2 in FIG. 5) are curved.

INDUSTRIAL APPLICABILITY

Embodiments of the invention may provide a power-off hold capability, and relatively high clamping force and push force in a device which has increased clamping assembly response speed by virtue of the use of a direct drive mechanism. Increased extension mechanism response speed is achieved by means of a relatively small moving mass and increased stiffness.

Embodiments of the invention overcome force, speed, power, power density, and non-power-off-hold limitations of prior art devices by using a novel clamp assembly design and an extension assembly design. The result is that force, speed, power (force×speed), and power density (power/mass) are all increased significantly as compared with previous Inchworm® motors and similar devices of comparable size and weight, while the advantages of high resolution and long travel of Inchworm® devices are maintained. The power-offhold capability allows it to be used in many applications where prior art devices could not be used.

One important reason for these improvements is the direct drive mechanism, i.e., beam 18, actuators 21/1, 21/2, that significantly increases the clamping assembly's response speed. Another second reason lies in the two uniquely designed clamp assemblies, which are fixed in space and provide power-off hold, high preloading force, and fast clamp response. Another important reason for these improvements is that the moving extension assembly, which integrates extension actuator 47, extension flexure unit 49, and the two shafts 12A, 12B is designed to be light, stiff and compact. The preferred actuators for both the clamp assemblies and the extension assembly are medium hard piezoelectric multi-layer actuators, due to their small size and light weight, high resolution, fast response speed, and high power density. On the whole, the above compact and low overall mass components make high speed, high force, and high output power density achievable.

Since the clamp assemblies are separate and can be individually mounted to anywhere needed, the frame of the motor can be tailored to particular applications (e.g., longer or shorter travel distance), or can be integrated into structures or frameworks with ease. This saves space and allows better flexibility. In addition, the clamp actuator and the extension actuator, when properly preloaded in compression by the unique flexure designs in the clamp and extension assembly, are expected to increase the motor durability and the longevity.

Another important feature of the new motor is its power-off hold capability, which does not exist in the above-mentioned previously-known Inchworm type motors. Power-off hold is desired in many industrial and military applications, because it allows a single driving circuit to serially drive several motors by multiplexing and therefore increases efficiency. Secondly, after a certain travel, motors in many cases are used just to hold that position. In this case, power-off hold motors do not waste power and generate no heat. A further advantage of power-off clamping may be improved safety.

It will be appreciated that instead of two actuators (21/1, 21/2) at the center of the double hinge, between the shafts), single actuator, or three or more actuators could be used. Advantageous features of the above-described apparatus which, in various combinations, are considered to be novel and non-obvious, include:

The clamp assembly comprising a double-hinge flexure, clamp actuator(s) and friction interfaces a) single actuator at the center of the double hinge (between shafts)

b) double actuators on either side of the double hinge (shaft at middle)

c). Clamp assembly made of 416 stainless steel hardened, typical.

d). Clamp actuator made of piezoelectric multi-layer actuators, medium hard, typical.

e) Adjusting hole at the clamp assembly top for coarse adjustment of preload.

f) Mating wedges used to preload the clamp actuators, which facilitate easy adjustments and ease of manufacture g) Adjustment fixtures (dual adjustments for fine preload) on the clamp assembly.

h) Means to further add preload force to the clamping actuators, e.g., replaceable leaf spring, access through a slot, and adjustment screws on the clamp assembly, which facilitate maximization of normal force and, hence, the actual push force generated by the device i) Leaf spring can be made of beryllium copper or stainless steel, typical.

j) Friction interfaces (clamping interfaces) on the double-hinge flexure (attachable pads)

k) surface finishes on flexure l) coatings made of thin film typically sputter deposition m) any combination of pads, surface finishes, and coatings n) Friction pads can be made of silver, typical.

o) Friction interfaces (clamping interfaces) of planar or curvature shape.

p) Bearing side-walls on the clamp assembly.

q) attachable bearing material pads r) coatings s) Bearing side-walls made of Teflon® pads, typical.

t) Bearing side-walls of planar or curved shape for circular motion.

u) A linear motor comprising two or multiple clamp assemblies, one extension assembly, and a frame that holds the clamp assemblies. The additional clamps would boost performance and could provide redundant braking [power-off hold].

v) Extension assembly including two shafts and one extension flexure and extension actuator.

x) Extension actuator can be made of piezoelectric multi-layer actuators, medium hard, typical.

y) Shaft can be made of SiC, typical.

z) Shaft having planar side bearing interfaces, or having a shaped surface along the long axis for bearing interfaces.

aa) Shaft having a groove (an interlocking surface) at end to facilitate the bond between the shafts and extension flexure, which has mating cutouts at both ends.

ab) Slotted shaft or split shaft joined at the end, e.g., by a coupling fixture. The slotted shaft allows force balance so that the beam (18) is raised uniformly. While, the concept could work with a single shaft and the actuator (21/1, 21/2) at the side, there would probably be a slight tilting to overcome and possible lower performance.

ac) Extension flexure to keep extension actuator under compression, e.g., having curved portions.

ad) Extension flexure made of 416 stainless steel hardened, typical.

ae) Extension actuator made of piezoelectric multi-layer actuators, medium hard, typical.

af) A linear motor comprising multiple clamp assemblies at each side and means for adjusting the phases to drive these clamp assemblies and the extension assembly to achieve increased push force and/or increased speed. The additional clamps would boost performance and could provide redundant braking [power-off hold].

ag) A linear motor comprising two clamp assemblies, a classic extension actuator of the classic Inchworm® motor, and a shaft that travels through both clamp assemblies. The two clamp assemblies are attached on both ends of the extension actuator.

ah) A rotary motor comprising two or multiple clamp assemblies, one extension assembly, and a frame. The clamp assemblies having friction interfaces shaped to match a curved shaft allowing circular motion to be achieved.

ai) A rotary motor comprising two or multiple clamp assemblies, one extension assembly, and a frame. The clamp assemblies having bearing side-walls shaped to match a curved shaft allowing circular motion to be achieved.

The invention claimed is:

1. Electromechanical translation apparatus comprising a support (10), first and second clamp assemblies (11A, 11B) fixedly secured to the support (10) at spaced apart locations, an extension actuator assembly (13) between the first and second clamp assemblies, and first and second movable members (12A, 12B) each having one end connected to a respective one of the opposite ends of the extension actuator assembly, the movable members (12A,12B) extending through the clamp assemblies (11A, 11B), respectively, wherein each clamp assembly comprises pressure means (18,29) and clamp actuator means (21/1,21/2) acting in opposition, the pressure means for applying, when the actuator means is de-energized, clamping force to releasably clamp the associated movable member to the clamp assembly, and the clamp actuator means, when energized, acting against the pressure means to release the movable member, and control means for selectively actuating the extension actuator and the clamp actuators so as to impart stepwise motion of the movable members relative to the support.

2. Apparatus according to claim 1, further comprising preloading means for ensuring a desired pressure upon the actuator.

3. Apparatus according to claim 2, wherein the preloading means comprises a pair of wedges movable one relative to the other to adjust the actuator relative to the pressure means.

4. Electromechanical translation apparatus comprising a support (10), first and second clamp assemblies (11A, 11B) fixedly secured to the support (10) at spaced apart locations, an extension actuator assembly (13) between the first and second clamp assemblies, and first and second movable members (12A, 12B) each having one end connected to a respective one of the opposite ends of the extension actuator assembly, the movable members (12A,12B) extending through the clamp assemblies (11A, 11B), respectively, wherein each movable member comprises a pair of limbs connected together at their respective ends and extending through the associated clamp assembly, the clamp assembly comprising actuator means for controlling releasable clamping of the limbs to the clamping assembly.

5. Apparatus according to claim 4, wherein the clamp actuator means comprises a single actuator means located between the limbs.

6. Apparatus according to claim 5, wherein the actuator means acts in opposition to a pressure member that applies pressure to clamp the limbs to the clamp assembly.

7. Apparatus according to claim 5, wherein the preloading means comprises a pair of wedges movable one relative to the other to adjust the actuator relative to the pressure means.

8. Apparatus according to claim 4, wherein the actuator means acts in opposition to a pressure member that applies pressure to clamp the limbs to the clamp assembly.

9. Apparatus according to claim 8, further comprising preloading means for ensuring a desired pressure upon the actuator.

10. Electromechanical translation apparatus comprising a support (10), first and second clamp assemblies (11A, 11B) fixedly secured to the support (10) at spaced apart locations, an extension actuator assembly (13) between the first and second clamp assemblies, and first and second movable members (12A, 12B) each having one end connected to a respective one of the opposite ends of the extension actuator assembly, the movable members (12A,12B) extending through the clamp assemblies (11A, 11B), respectively, wherein the extension actuator assembly comprises a piezoelectric actuator element (47) housed in a holder (49) having means for applying compressive stress to the actuator element.

11. Apparatus according to claim 10, wherein the compressive stress applying means comprises a pair of bow members extending between respective end portions of the holder and on opposite sides of the piezoelectric element, the bow members each being prestressed outwardly so as to urge said end portions towards each other and compress the piezoelectric actuator element therebetween.

12. Electromechanical translation apparatus comprising a support (10), at least one member movable relative to the support, first and second clamp assemblies (11A, 11B) for selectively clamping the movable member to the support, and extension means for extending and contracting to impart stepwise relative motion between the support and the movable member, wherein each clamping assembly comprises a piezoelectric clamping actuator (21/1, 21/2) and preloading means for applying a preload force to the piezoelectric actuator.

13. Apparatus according to claim 12, wherein the movable member extends through the associated clamping assembly and the preloading means comprises a pair of wedges movable one relative to the other to adjust the actuator.

14. Apparatus according to claim 13, wherein the extension means comprises a piezoelectric extension actuator and means for preloading the extension actuator compressively.

15. Apparatus according to claim 12, wherein the extension means comprises apiezoelectric extension actuator and means for preloading the extension actuator compressively.

16. Apparatus according to claim 15, wherein the means for preloading the extension actuator comprises a holder having prestressed elements extending between respective ends of the holder and prestressed outwardly so as to urge the ends together and apply compression to the actuator element.

* * * * *

UNITED STATES PATENT AND TRADEMARK OFFICE
CERTIFICATE OF CORRECTION

PATENT NO. : 7,045,932 B2  Page 1 of 1
APPLICATION NO. : 10/793365
DATED : May 16, 2006
INVENTOR(S) : Qin Xu and John C. Fasick It is certified that error appears in the above-identified patent and that said Letters Patent is hereby corrected as shown below:

The Assignee information which should appear on the patent is as follows:

Assignee: EXFO BURLEIGH PRODUCTS GROUP INC., Victor, New York (US)

Signed and Sealed this

Sixth Day of March, 2007

JON W. DUDAS
*Director of the United States Patent and Trademark Office*